(12) United States Patent
Plötz et al.

(10) Patent No.: US 7,173,384 B2
(45) Date of Patent: Feb. 6, 2007

(54) ILLUMINATION DEVICE AND CONTROL METHOD

(75) Inventors: Ludwig Plötz, Arnschwang (DE); Alois Biebl, Train-St. Johann (DE); Andre Philipp, Marbach (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 11/240,274

(22) Filed: Sep. 29, 2005

(65) Prior Publication Data

US 2006/0066265 A1   Mar. 30, 2006

(30) Foreign Application Priority Data

Sep. 30, 2004  (DE) .................... 10 2004 047 669

(51) Int. Cl.
*G05F 1/00* (2006.01)
(52) U.S. Cl. .............. 315/291; 315/308; 315/312; 315/224; 345/83; 345/102
(58) Field of Classification Search ........ 315/307–309, 315/291, 224, 312, 209 R, 169.1–169.3; 345/82–102, 207, 690
See application file for complete search history.

(56) References Cited

U.S. PATENT DOCUMENTS

| | | | | |
|---|---|---|---|---|
| 6,975,079 | B2 * | 12/2005 | Lys et al. ................ | 315/292 |
| 7,002,546 | B1 * | 2/2006 | Stuppi et al. ............. | 345/102 |
| 2005/0116665 | A1 * | 6/2005 | Colby et al. ............. | 315/291 |
| 2006/0006821 | A1 * | 1/2006 | Singer et al. ............ | 315/312 |
| 2006/0017402 | A1 * | 1/2006 | McKinney et al. ....... | 315/291 |
| 2006/0103612 | A1 * | 5/2006 | Ozaki ..................... | 345/83 |

OTHER PUBLICATIONS www.mazet.de/doc1/app99112.pdf, no date.
www.mazet.de/doc1/app03121.pdf, no date.
www.mazet.de/doc1/app99114.pdf, no date.
www.taosinc.com/downloads/pdf/tcs230wp.pdf, Jan. 29, 2004.

* cited by examiner

*Primary Examiner*—Hoanganh Le
*Assistant Examiner*—Tung Le
(74) *Attorney, Agent, or Firm*—Cohen Pontani Lieberman & Pavane LLP

(57) ABSTRACT

A description is given of an illumination device which emits mixed-color light containing light of at least two different color channels (R, R1, G, G1, B, B1). The illumination device contains at least one primary light source (1) of a first color, the light of which forms a first color channel (R, G, G1, B, B1), and at least one primary light source (1) of a second color, the light of which forms a second color channel (R, R1, G, G1, B, B1), at least one sensor device (3), which is positioned such that it can receive mixed-color light and is suitable for detecting brightness of light of a wavelength range comprising the color channels (R, R1, G, G1, B, B1) and which determines the brightnesses of the different color channels (R, R1, G, G1, B, B1) separately and repeatedly during operation. Furthermore, the illumination device contains an evaluation and control device (4), which evaluates the brightness values of the color channels (R, R1, G, G1, B, B1) and determines pulse-width-modulated electrical signals with a basic period (11) modified in such a way for the driving of the individual color channels (R, R1, G, G1, B, B1) in such a way that the color location of the mixed-color light lies within a predetermined region of the CIE standard chromaticity diagram. A method is also described for controlling such an illumination device.

18 Claims, 6 Drawing Sheets

FIG 2C

| Correction in direction | Positive control | | | Negative control | | |
|---|---|---|---|---|---|---|
| | R | G | B | R | G | B |
| no correction necessary | + | + | + | 0 | 0 | 0 |
| red | + | 0 | 0 | 0 | − | − |
| green | 0 | + | 0 | − | 0 | − |
| blue | 0 | 0 | + | − | − | 0 |
| yellow | + | + | 0 | 0 | 0 | − |
| cyan | 0 | + | + | − | 0 | 0 |
| violet | + | 0 | + | 0 | − | 0 |

| Basic period | Measurement |
|---|---|
| 1 | none, only blanking |
| 2 | red |
| 3 | blanking with dark measurement |
| 4 | green |
| 5 | none, only blanking |
| 6 | blue |

ILLUMINATION DEVICE AND CONTROL METHOD

RELATED APPLICATIONS

This patent application claims the priority of German patent application 10 2004 047 669.1, filed Sep. 30, 2004, the disclosure content of which is hereby incorporated by reference.

FIELD OF THE INVENTION

The invention relates to an illumination device and a method for controlling such an illumination device.

BACKGROUND OF THE INVENTION

Illumination devices such as, for example, backlighting arrangements for displays or luminous means for Luminas generally comprise, for generating mixed-color light, primary light sources of different colors, the light of which is mixed additively.

If the brightnesses of the primary light sources are subject to fluctuations on account of external influences such as, for example, temperature changes or ageing processes, the color location of the mixed-color light on the CIE standard chromaticity diagram is shifted undesirably. In order to keep the color location of mixed-color light constant, feedback control systems have been proposed which measure the brightnesses of the different color channels with the aid of color sensors and determine and control the resultant color location.

Color sensors are components which can detect electromagnetic radiation of a limited wavelength range. They may comprise a photodiode, for example, which is provided with a color filter, so that said photodiode only detects light of a specific spectral range.

Descriptions of color sensors, and also application examples for calibration systems and feedback control systems for displays which use color sensors can be found for example at www.mazet.de/doc1/app99112.pdf, www.mazet.de/doc1/app03121.pdf, www.mazet.de/doc1/app99114.pdf and www.taosinc.com/downloads/pdf/tcs230wp.pdf.

Color sensors have a series of disadvantages, however, which may lead to inaccuracies in the brightness measurements and increase the complexity of the control system. Thus, only color sensors with specific detection ranges are available commercially. Therefore, the detection range is rarely coordinated precisely with the spectrum of the primary light sources. Moreover, the limits of the detection range have a profile that usually runs in continuous fashion and not in sharply delimited fashion.

SUMMARY OF THE INVENTION

It is an object of the present invention to provide an illumination device which emits mixed-color light whose color location is kept constant in an approved manner.

A further object of the present invention is to provide a simple control method for such an illumination device.

These objects are attained in accordance with one aspect of the present invention directed to an illumination device which emits mixed-color light during operation, said light containing light of at least two different color channels, comprises at least one first primary light source of a first color, the light of which forms a first color channel, at least one second primary light source of a second color, the light of which forms a second color channel, at least one sensor device, which is positioned such that at least one single light sensor of the sensor device can receive mixed-color light and is suitable for detecting brightness of light of a continuous wavelength range comprising the color channels and which determines the brightnesses of the different color channels separately and repeatedly during operation, and an evaluation and control device, which, during operation, evaluates the brightness values of the color channels and determines pulse-width-modulated electrical signals with a basic period modified in such a way for the driving of the individual color channels that the color location of the mixed-color light lies within a predetermined region of the CIE standard chromaticity diagram.

Since the detection range of a single light sensor of the sensor device is continuous and comprises the wavelength ranges of the color channels, primary light sources of any desired wavelength can be used. The sensor device preferably contains no color filters. Inaccuracies in determining the color location such as may occur when using color sensors are thus avoided to the greatest possible extent.

In order that the brightnesses of the different color channels can be determined separately with such a sensor device, the color channels are driven with modified pulse-width-modulated electrical signals.

A pulse-width-modulated signal, as the person skilled in the art is aware, is a signal, preferably a square-wave signal, which is turned on for a specific time $t_{on}$ within a fixed basic period and is turned off for the rest of the duration of the basic period $t_{off}$. The ratio of on time and basic period $t_{on}/(t_{on}+t_{off})$ is designated as the duty ratio. It specifies the percentage proportion of time over which the square-wave signal is turned on within the basic period.

According to the present invention, the basic period is modified in order to determine start values for a method for controlling the color location.

The color location of the mixed-color light is essentially determined by the principle of additive color mixing. It can be altered and set by varying the brightnesses of the individual colors. If the brightness of a color is increased, its proportion in the mixed color of the light increases and the color location of the mixed-color light is shifted in the direction of the color whose brightness was increased.

The CIE standard chromaticity diagram, which was defined by the International Commission on Illumination, is a representation of all color locations which can be mixed additively from spectral colors. It is known to the person skilled in the art and will therefore not be explained in any greater detail at this juncture.

In one preferred embodiment, the illumination device comprises at least one red, one green and one blue primary light source, from the light of which the color channels red, green and blue are respectively formed.

The three primary colors red, green and blue, the so-called primary valences, span within the CIE standard chromaticity diagram a triangle that covers a large region of the CIE standard chromaticity diagram. All color valences within said triangle and thus a large region of the CIE standard chromaticity diagram can be generated by additive mixing of the primary colors red, green and blue. The color location of an illumination device with the three color channels red, green and blue can therefore be set by varying the brightnesses of the color components as desired within the color triangle.

In one preferred embodiment of the illumination device, the region sought for the color location of the mixed-color light lies in the white region. On the one hand, white light, in particular light that is similar to sunlight, is necessary for many applications. On the other hand, the human eye is particularly sensitive to color changes in white, which necessitates control of the color location particularly frequently.

Furthermore, the illumination device preferably contains at least six primary light sources, the light of which respectively forms two red, two green and two blue color channels, the sensor unit determining the brightness of the individual color channels separately and repeatedly and the evaluation and control unit in each case determining pulse-width-modulated signals for each color channel separately. The doubled number of color channels permits more accurate control of the color location of the mixed-color light. Furthermore, the control method is less dependent on external influences such as, for example, light from other sources.

The illumination device preferably comprises, as primary light sources, organic light emitting diodes (OLED), lasers, electroluminescent films or, in particular, light emitting diodes ("LED" for short) based on semiconductor materials.

These primary light sources have the advantage that, in contrast to e.g. incandescent lamps, their brightness can be changed without a long time delay by varying the electrical signal. They are therefore suitable for driving with modified pulse-width-modulated signals for the purpose of setting their brightness.

In a further preferred embodiment, the evaluation and control device of the illumination device comprises a microcontroller. It may equally comprise an application specific integrated circuit (ASIC), a processor (CPU), an analog computer or a PC.

A microcontroller affords the advantage, in particular, of being small and enabling a compact design of the evaluation and control device. Furthermore, a microcontroller is distinguished by a low power consumption and therefore by low evolution of heat.

The sensor device of the illumination device preferably comprises a photodiode. It may also comprise a photoresistor, a charge coupled device chip (CCD chip) or a phototransistor.

Photodiodes are particularly suitable for detection since they are available in multiple embodiments, are favorable and insensitive to ageing, and also have a fast response behavior.

The illumination device according to the invention may preferably be used for the backlighting of displays, in particular of LCD displays. These are known to the person skilled in the art and will therefore not be explained in any greater detail at this juncture.

LCD displays afford a series of advantages such as, for example, a small component thickness and high resolution. On account of their method of operation, however LCD displays do not generate light themselves, but always require backlighting.

The LCD display may also comprise an active matrix for driving the pixels (TFT display). In contrast to conventional LCD displays with a passive matrix, in which the LCD cells are driven with the aid of a matrix-type arrangement of row and column electrodes, in the case of LCD displays with an active matrix each individual cell can be driven with a thin film transistor. This affords the advantage of being able to use liquid crystals which change their phase in a very short time upon application of a voltage. This leads to better contrast, greater freedom from flicker and short response times of the displays.

Further possibilities for application of the invention can be found for example in color copiers, scanners and projection systems, such as beamers.

Another aspect of the present invention is directed to a method for controlling an illumination device which emits mixed-color light containing light of at least two different color channels, in which each color channel is driven with a pulse-width-modulated electrical signal with a sequence of basic periods the basic periods of a pulse-width-modulated electrical signal are in each case modified such that the basic periods contain a first time interval during which all of the color channels are turned on simultaneously. The basic periods of a pulse-width-modulated electrical signal are in each case modified such that they contain at least one second time interval during which only one of the at least two color channels is turned on and the brightness of the turned-on color channel is in each case determined separately. The modified basic periods succeed one another and form an overall period, which is repeated. After the overall period has elapsed, the ratio of the brightnesses of the individual color channels is compared and the duty ratios of the respective modified pulse-width-modulated electrical signals are set such that the color location of the mixed-color light lies within a predetermined region of the CIE standard chromaticity diagram.

The use of modified pulse-width-modulated signals makes it possible to determine in a simple manner the values which a control algorithm needs as start values in order to control the color location of an illumination device which emits mixed-color light composed of different color channels and comprises a sensor device having at least one light sensor which can determine brightnesses of light having different colors within a continuous wavelength range. Furthermore, this method makes it possible to control the color location of the illumination device during luminous operation in conjunction with good brightness of the illumination device. There is no need for any particular operating mode, such as a test mode for example, to bring the color location of the mixed-color light of the illumination device into the predetermined region.

Moreover, the simple control principle minimizes the programming complexity and thus enables control by a microcontroller, by way of example.

In general, the brightnesses of light sources which have a nonlinear relationship between brightness and current intensity in the event of operation with direct current depend linearly on the duty ratio of pulse-width-modulated signals. The brightnesses of such light sources, such as light emitting diodes for example, can for this reason usually be controlled more simply if they are operated with pulse-width-modulated signals.

Preferably, the overall period of the pulse-width-modulated electrical signals contains at least one basic period which is modified such that no color channel is turned on within a time interval of the basic period and the background brightness is determined within this time interval. After the determination of the brightness value of a color channel and the measurement of the background brightness, the value of the background brightness can be subtracted from the brightness value of a color channel and thus be corrected. This makes the control method to the greatest possible extent independent of disturbing influences from the surroundings, such as light from other sources for example, and contributes to the stability of the control method.

Preferably, within the time interval of a basic period for determining the brightness of a color channel, a plurality of measured values of the brightness of this color channel are successively recorded and averaged.

It is likewise preferred, within the time interval for determining the background brightness, for a plurality of measured values of the background brightness to be recorded and averaged.

The use of average values as parameters for the control algorithm advantageously eliminates the influence of statistical errors and contributes to the stability of the control method.

Furthermore, the intervals during which a measurement of the background brightness or of the brightness of a color channel is carried out preferably have the same length since this simplifies the control method.

Preferably, the time intervals for measuring the brightness of a color channel and, respectively, the background brightness are shorter than the time interval in which the respective color channel is luminous. The intervals during which brightness measurements are carried out reduce the brightness impression imported to a viewer by the illumination device, so that it is advantageous to keep these time intervals as short as possible in order to obtain an illumination device with the greatest possible brightness.

Preferably, an overall period is shorter than 0.01 second. This leads to frequencies of the bright-dark sequences and of the color changes brought about by the driving of the color channels with the pulse-width-modulated signals of greater than 100 Hz. Since the human eye normally can no longer temporarily resolve bright-dark or color changes with frequencies of 100 Hz, an image that is free of flicker to the greatest possible extent can thus be generated.

Furthermore, it is preferred, within the overall period, for the basic periods within which the brightness of a color channel is determined to alternate with those within which the brightness values of the background light is determined.

BRIEF DESCRIPTION OF THE DRAWINGS

FIG. 2c shows a table listing the possible correction steps from FIG. 2b and their implementation with the aid of positive control or negative control, the symbol + in this connection meaning that the brightness of the respective color channel is increased, the symbol 0 meaning that the brightness remains the same, and the symbol—meaning that it is reduced.

DETAILED DESCRIPTION OF THE DRAWINGS

Figure 1A:
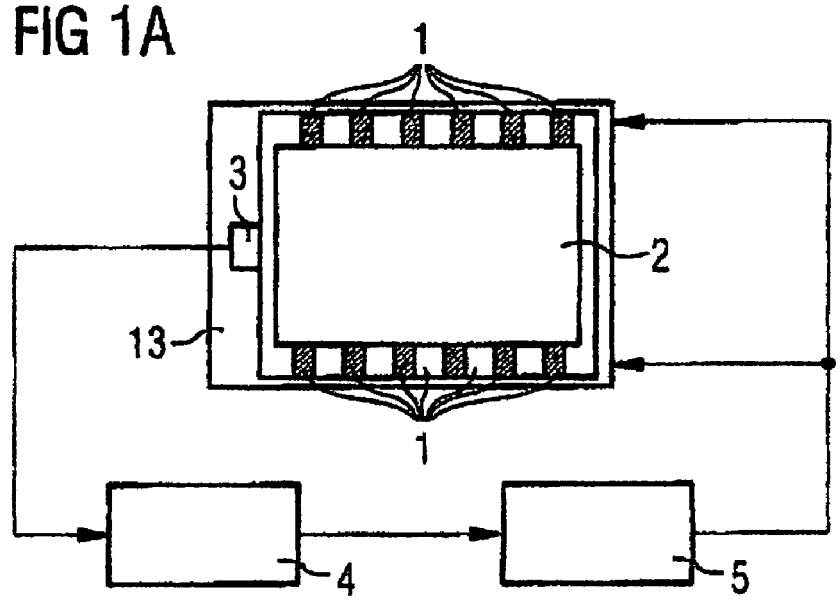
FIGS. 1a and 1b show schematic illustrations of the construction of an illumination device.

In the exemplary embodiments and figures, identical or identically acting constituent parts are in each case provided with the same reference symbols. The illustrated elements of the figures are, in principle, not to be regarded as true to scale. Rather, there may be illustrated in part with their size exaggerated in order to afford a better understanding.

In the case of an illumination device, RGB light emitting diodes ("RGB LED" for short), for example, may be used as primary light sources 1.

RGB LEDs 1 are components in the case of which three LED semiconductor chips are situated in a housing, one of which chips emits red light, one emits green light and one emits blue light. The varicolored light emitted by the three LED semiconductor chips during operation is mixed additively, so that a viewer perceives mixed-color light. By varying the brightness of the individual colors, it is possible to realize different color locations of the light, in particular in the white region of the CIE standard diagram.

The RGB LEDs 1 are arranged in two rows on a carrier 13 (cf. FIG. 1a), so that their light is mixed. In the case of the exemplary embodiment in accordance with FIG. 1a, the RGB LEDs 1 couple into an optical waveguide 2, so that their light is mixed in the optical waveguide 2.

The light from the red LED chips together forms a red R color channel, the light from the green LED chips together forms a green G color channel, and the light from the blue LED chips together forms a blue B color channel. The LED chips are driven with pulse-width-modulated electrical signals since their brightness depends linearly on the duty ratio and the brightness control of the color channels R, G, B can thus be simplified.

The brightnesses of the individual color channels R, G, B can be determined by means of a sensor device 3, which is fitted such that it detects the color channels R, G, B whose brightness values it is intended to determine. The sensor device 3 may be a photodiode, for example, which is fitted laterally with respect to the optical waveguide 2.

The evaluation and control device 4, for example a microcontroller, determines the actual value of the color location of the mixed-color light from the brightness values of the color channels red R, green G and blue B and compares the actual value with the desired value. If the difference between actual value and desired value lies outside a predetermined tolerance range, the evaluation and control device 4 determines and generates new duty ratios of the pulse-width-modulated electrical signals for driving the individual color channels R, G, B and impresses them on the constant electrical signal of the driver device 5. Commercially available components may be used as the microcontroller. By way of example, a PIC microcontroller PIC 18f242 may be used.

The driver device 5 is preferably a constant current source on which the pulse-width-modulated signals of the evaluation and control device 4 are impressed, so that the LED semiconductor chips of different colors are in each case turned on within a time interval in accordance with the respective duty ratio of the respective pulse-width-modulated electrical signal and are turned off in the remaining time. The driver device 5 comprises a driver component per driven color channel R, G, B. The driver component used may be the IC component TLE 4242 from Infineon, by way of example. This component keeps the electrical signal constant by converting excess energy into heat loss.

Furthermore, the driver device 5 may also contain clocked driver components that are distinguished by high efficiency since they do not convert excess energy into heat loss. The electrical signal of a clocked driver component is superposed with a high-frequency signal and therefore has high-frequency oscillations. Such driver components may likewise be used if the high-frequency oscillations are so small that the control method is not influenced by them.

Figure 1B:
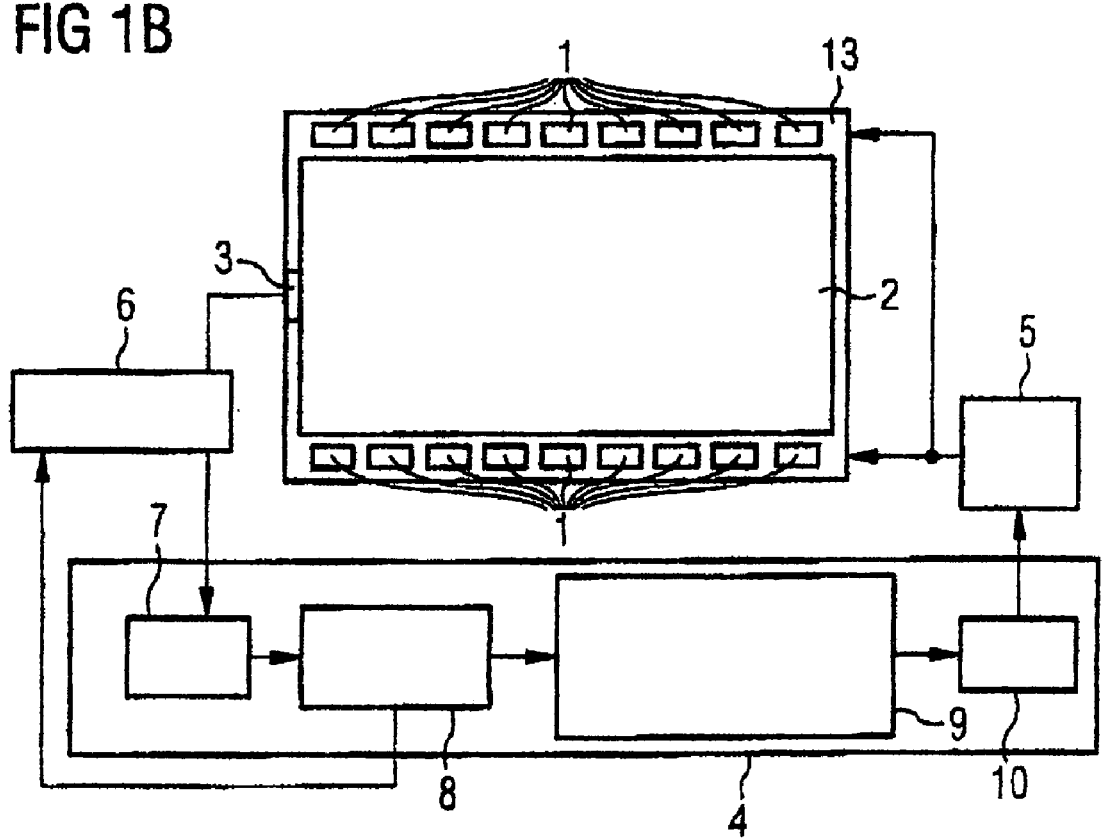

FIG. 1*b*, in contrast to FIG. 1*a*, additionally symbolically illustrates a controllable amplifying unit 6 and also the subunits analog-to-digital converter 7, evaluation unit 8, correction unit 9 and pulse width modulation unit 10 within the evaluation and control device 4, which are intended to illustrate the individual functions of the evaluation and control device 4.

The controllable amplifying unit 6 has the task of converting the analog electrical signal of the photodiode 3 into a voltage signal and amplifying it such that it can be processed by the analog-to-digital converter 7. The controllable amplifying unit 6 may be for example an inverted operational amplifier (OPA) with a linear behavior. An OPA essentially generates an amplified signal of the difference from the signals present at its two inputs. Since the OPA operates in inverting fashion, the output voltage decreases upon illumination of the photodiode 3. The MCP602 from the company Microchip, by way of example, may be used as the OPA.

The amplified analog signal of the photodiode 3 is converted into a digital signal by the analog-to-digital converter 7 and then communicated to the evaluation unit 8. The evaluation unit 8 determines the actual value of the color location from the brightness values of the color channels red R, green G and blue B and compares it with the predetermined desired value. If the difference between actual value and desired value of the color location lies outside a predetermined tolerance range, the correction unit 9, with the aid of a predetermined correction scheme, determines which color channel R, G, B has to become brighter or darker. Afterward, the subunit pulse width modulation 10 generates pulse-width-modulated signals with the correct duty ratio and impresses them on the constant electrical signal of the driver device 5, which drives the RGB LEDs 1 with the signal thus produced.

Figure 2A:
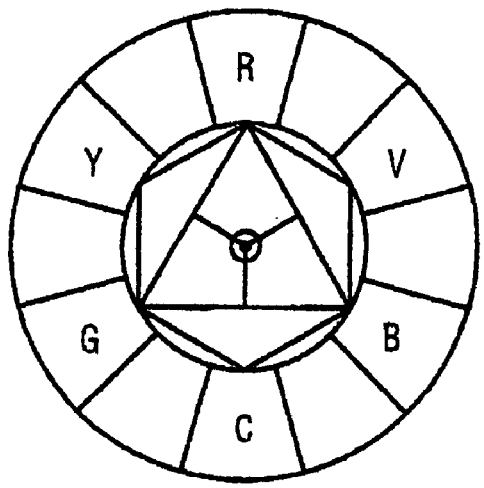
FIG. 2a shows a schematic illustration of a virtual chromatic circle with the colors red (R), violet (V), blue (B), cyan (C), green (G) and yellow (Y) on the basis of which the correction of the color location is carried out.

An explanation is given below, on the basis of the virtual chromatic circle illustrated in FIG. 2*a*, of the predetermined correction scheme according to which the correction unit 9 determines which color channel R, G, B has to be controlled brighter or darker.

The chromatic circle shows circumferentially the colors red R, violet V, blue B, cyan C, green G and yellow Y. Red R, green G and blue B correspond to the colors of the three color channels R, G, B which form the corner points of the color space. Represented between two of these so-called primary valences in each case is the color produced by mixing the two adjacent primary valences.

On the basis of the ratio of the brightnesses of the three color channels red R, green G and blue B with respect to one another, the correction unit decides on the "color direction" in which the next correction step is to be executed. In this case, there are seven decision possibilities corresponding to the colors red R, violet V, blue B, cyan C, green G and yellow Y and also no change (center 0 of the chromatic circle).

The decision as to the "color direction" in which the next correction step is to be executed is taken with the aid of an algorithm that can be executed by a microcontroller.

The algorithm uses as variables positive 8-bit numbers (type I), positive 16-bit numbers (type II) and 16-bit numbers with positive and negative signs (type III). The present actual values of the brightnesses $X_R$, $X_G$ and $X_B$ of the individual color channels R, G, B which have been determined by the photodiode 3 must be present in each case before the start of the algorithm. Moreover, for the brightness of the color channels R, G, B there is prescribed in each case a desired value $Y_R$, $Y_G$ and $Y_B$, and also an error summation threshold $Z_{max}$. The error summation threshold $Z_{max}$ is the maximum possible value of the error sum Z, which represents the sum of the differences between actual value and desired value of the brightnesses of the individual color channels R, G, B:

$$Z_{max}=\text{Max }[Z]=\text{Max}[(Y_R-X_R)+(Y_G-X_G)+(Y_B-X_B)].$$

Furthermore, the information about the present duty ratio $A_R$, $A_G$ and $A_B$ of the individual color channels R, G, B is present before the start of the algorithm.

Figure 2B:
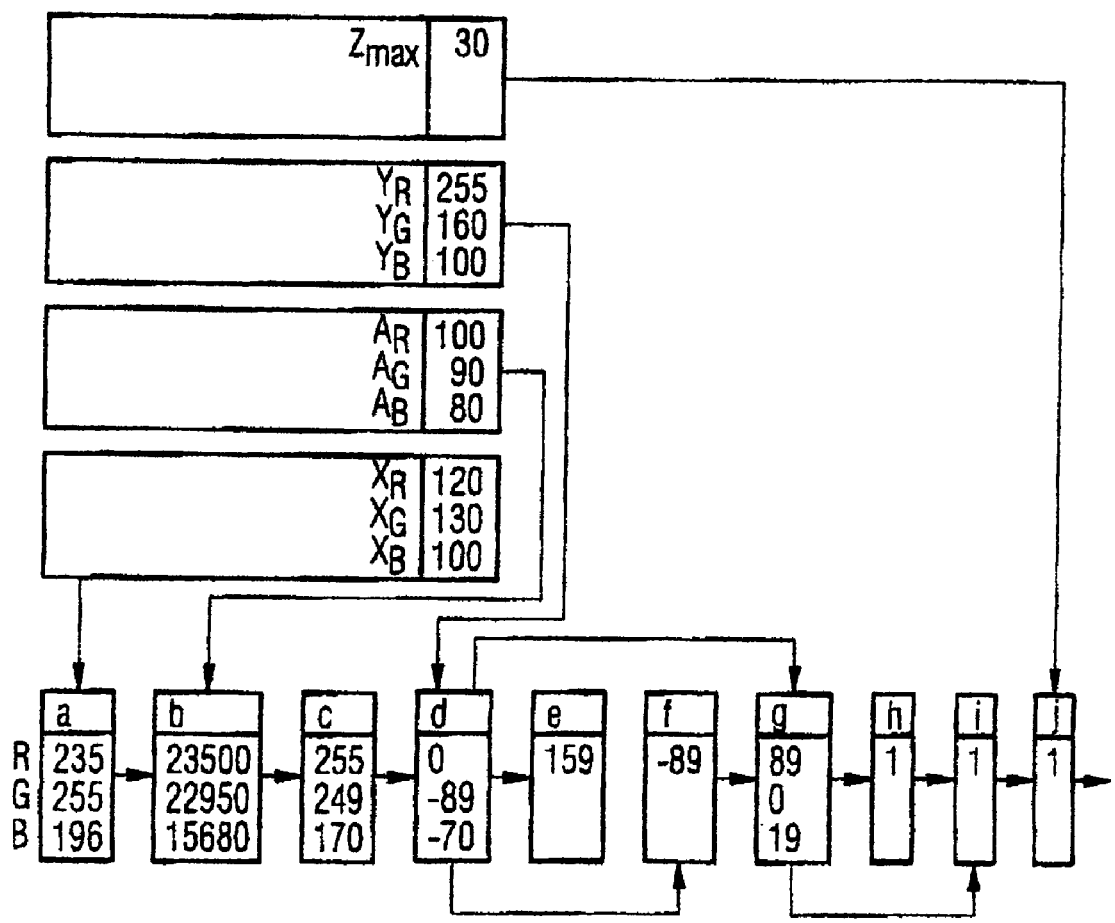
FIG. 2b shows a flow diagram of the computational steps of the algorithm by means of which the correction steps of the control are determined.

The algorithm proceeds in steps a) to j), the sequence of which is illustrated schematically with exemplary numbers in FIG. 2*b* and is explained below:

a) normalization of the actual values of the brightness $X_R$, $X_G$ and $X_B$ of each color channel R, G, B to a variable of type I.

b) Multiplication of the normalized actual values of the brightness of each color channel R, G, B from step a) by the respective value of the present duty ratio $A_R$, $A_G$ and $A_B$. The result is a variable of type II per color channel R, G, B, which is a measure of the color proportions made up by each color channel R, G, B in the color of the mixed light.

c) Normalization of the values from b) to a variable of type I.

d) Determination of the difference between the desired value of the brightness $Y_R$, $Y_G$ and $Y_B$ of each color channel R, G, B and the values from step c) for each color channel R, G, B. The result is the present color error value per color channel R, G, B, which is in each case a variable of type III.

e) Determination of the present error sum Z by summation of the difference magnitudes from step d). The result is a variable of type II.

f) Determination of the value from step d) with a negative sign which has the largest magnitude. If there is no negative value, the result of step f) is equal to zero. The result is a variable of type III.

g) Addition of the value from step f) to each of the three results from step d). By means of this step, all color error values from step d) are output as positive numbers of type II.

h) Determination of the color channel R, G or B with the largest color error value from step g). The result is a variable of type I.

i) Checking whether one of the other color channels red R, green G and blue B has a color error value Z equal in magnitude according to step g) and therefore has to be corrected to an extent precisely as great as the color channel that was determined in step h). If the answer is "no", as in the depicted example, then numeral "1" in "i" of FIG. 2B means that brightness of only the red color channel has to be enhanced. If the answer is "yes", the correction step has to be executed in the direction of one of the mixed colors yellow Y, cyan C or violet V. If all values from step g) are identical in magnitude, no correction is carried out.

j) If the present error sum Z from e) is less than the predetermined maximum value $Z_{max}$, it is likewise the case that no correction is carried out. With the aid of this threshold value condition, a tolerance range within the CIE standard chromaticity diagram is prescribed in which the color location is to be situated. If the color location is situated within this tolerance range, no control is carried out. If the color location is situated outside the tolerance range, the control reacts and executes corresponding correction steps. In the depicted example, Z is not smaller than $Z_{max}$, and the "1" in "j" of FIG. 2B means that the red color channel has to be enhanced.

It should be pointed out at this juncture that the method according to the invention can, of course, be carried out not only with the aid of this algorithm but, for example, also with a similar algorithm comprising a PID controller. Such an algorithm generally affords the advantage that it permits short computation times. A PID controller is known to the person skilled in the art and will therefore not be explained in any greater detail at this juncture.

Each color channel R, G, B is driven with a pulse-width-modulated electrical signal and has a brightness corresponding to the discrete duty ratio of said pulse-width-modulated signal. A minimum possible duty ratio and a maximum possible duty ratio which cannot be undershot and exceeded, respectively are defined. If the next correction step establishes for example an increase in the duty ratio for the color red and the latter is already in the fully modulated state, the remaining two colors must be reduced in terms of their duty ratio in order thus to amplify the color red relative to the other colors.

If no correction is necessary, firstly an attempt is made to increase the brightnesses of all the color channels in the same ratio (positive control) until the maximum duty ratio of at least one color channel R, G, B is reached (cf. FIG. 2c). If this state is reached, no more alterations whatsoever are performed (negative control).

If a correction step in the direction of one of the primary colors red, green or blue is necessary, firstly an attempt is made to increase the brightness of this color channel R, G, B (positive control). If the duty ratio thereof already corresponds to the maximum possible value the brightness of the other two color channels is reduced (negative control). For the case where a correction step in the direction of one of the mixed colors violet V, cyan C or yellow Y is necessary, firstly an attempt is made to increase the brightness of the color channels R, G, B which form this color (positive control). If this is not possible since the duty ratio of one of these two color channels R, G, B already corresponds to the maximum possible value, the brightness of the other color channel R, G, B is reduced (negative control).

This method has the advantage that the control is at any time oriented to the color channel R, G, B which limits the brightness. Since, in accordance with the correction scheme (FIGS. 2a and 2c), firstly an attempt is made to carry out a required correction step with positive control, no brightness is "given away" in order to achieve the hue sought. Moreover, a color channel R, G, B is always driven with the maximum possible duty ratio.

Figures 3A, 3B:
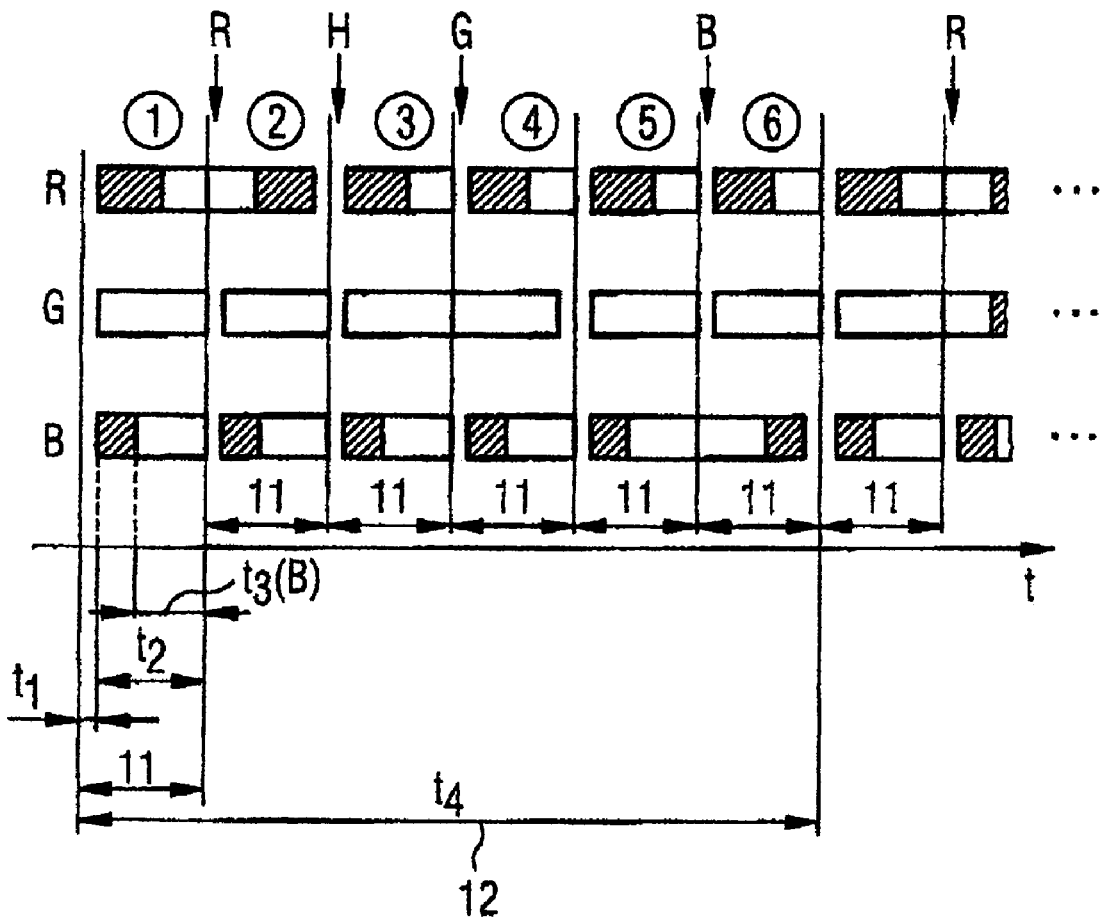
FIG. 3a shows schematic illustrations of modified pulse-width-modulated signals for driving a red (R), a green (G) and a blue (B) color channel.
FIG. 3b shows a table with the steps that are carried out during the respective basic period 11 from FIG. 3a, FIG. 4a shows a schematic illustration of an illumination device with two red, two green and two blue color channels.

The exemplary embodiment in accordance with FIG. 3a shows a diagram of modified pulse-width-modulated electrical signals for controlling respectively a red R, a green G and a blue B color channel one above the other which enable the measured value recording for the control.

The three pulse-width-modulated signals are composed of basic periods 11 having the same length and proceed without a temporal offset with respect to one another.

A basic period 11 is divided into a time interval having the length $t_1$ and a time interval having the length $t_2$. The time interval $t_1$ is provided for carrying out measurements by means of the sensor device 3. The time interval $t_1$ may amount for example to a few microseconds up to half a millisecond. The time interval $t_2$ represents the period of time resulting from the predetermined maximum duty ratio within which the color channels R, G, B can be turned on. The actual duration $t_3$ for which the respective color channel R, G, B is turned on is determined in a prescribed manner according to the respective present duty ratio by the evaluation and control device 4.

For measuring the brightness of a color channel R, G, B, the time interval $t_3$ in which the corresponding color channel R, G, B is turned on is situated at the beginning of the basic period 11, while the remaining color channels R, G, B are luminous at the end of the basic period 11 with a duration $t_3$ corresponding to the respective duty ratio. A measurement of the brightness of a color channel R, G, B can thus be carried out at the beginning of the basic period 11 in the time interval $t_1$.

For measuring the background brightness, all time intervals $t_3$ are situated at the end of the basic period 11. If a measurement of the brightnesses is then carried out in the time interval $t_1$ at the beginning of the basic period, the background brightness can be detected.

An overall period 12 of the modified pulse-width-modulated signals in FIG. 3a is composed of six successive basic periods. No measurement takes place during the first basic period 11, the brightness of the red color channel R being determined in the second basic period 11. The background brightness is determined during the third basic period 11, which is followed by a basic period 11 within which the brightness value of the green color channel G is determined. No measurement once again takes place in the fifth basic period 11, which is followed by a basic period 11 within which the brightness value of the blue color channel B is determined (in this respect also cf. FIG. 3b).

The overall period 12 has a duration $t_4$ composed of the duration of the individual basic period 11. If said duration $t_4$ is less than 0.01 seconds, the turn-on and turn-off operations for the color channels are so fast that the human eye generally cannot perceive any flicker.

Figure 4A:
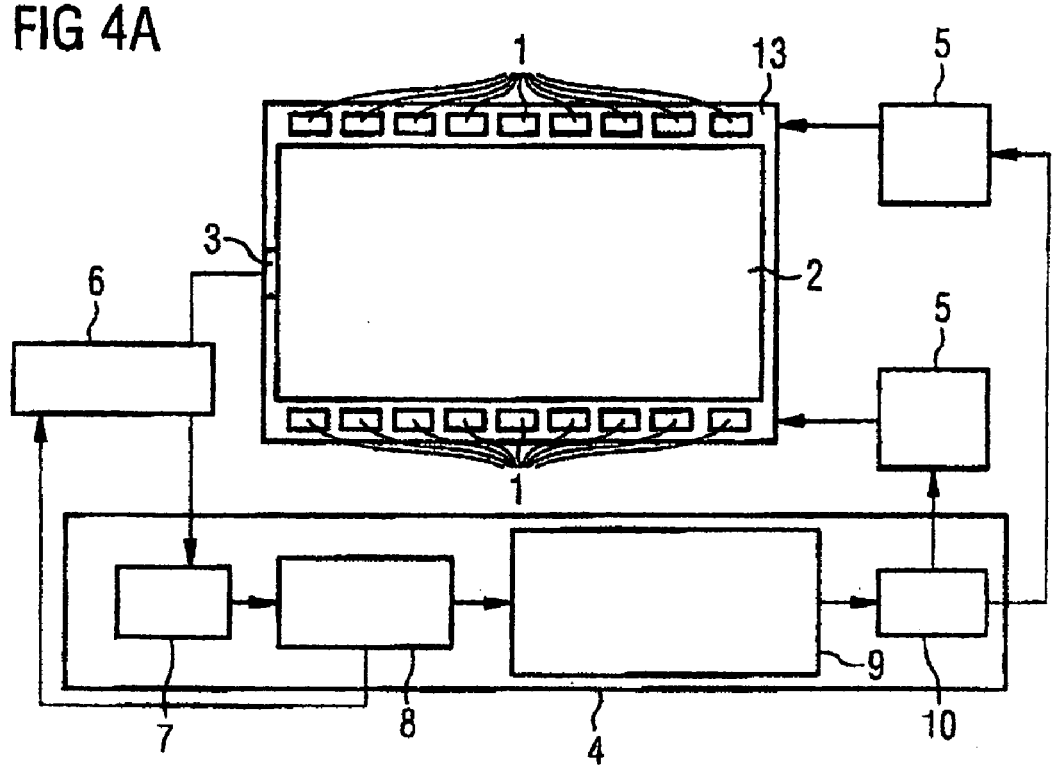
FIG. 4b shows a schematic illustration of modified pulse-width-modulated signals for controlling two red (R1, R2), two green (G1, G2) and two blue (B1, B2) color channels.

In contrast to the exemplary embodiment in accordance with FIGS. 1a and 1b, in the exemplary embodiment in accordance with FIG. 4a the two rows with RGB LEDs 1 are driven and controlled independently of one another. The red, green and blue light of the RGB LEDs 1 forms, per row, in each case a red R1, R2, a green G1, G2 and a blue color channel B1, B2, so that a total of six color channels R1, R2, G1, G2, B1, B2 arise which are in each case driven with a modified pulse-width-modulated electrical signal.

One driver device 5 per row is necessary for driving the RGB LEDs 1, so that a further driver device 5 is required in contrast to the exemplary embodiment in accordance with FIG. 1a.

The measurement of the brightness of the individual color channels R1, R2, G1, G2, B1, B2 may furthermore be effected by means of a single light sensor 3, such as a photodiode for example. The latter is once again arranged laterally with respect to the optical waveguide 2, by way of example.

Figure 4B:
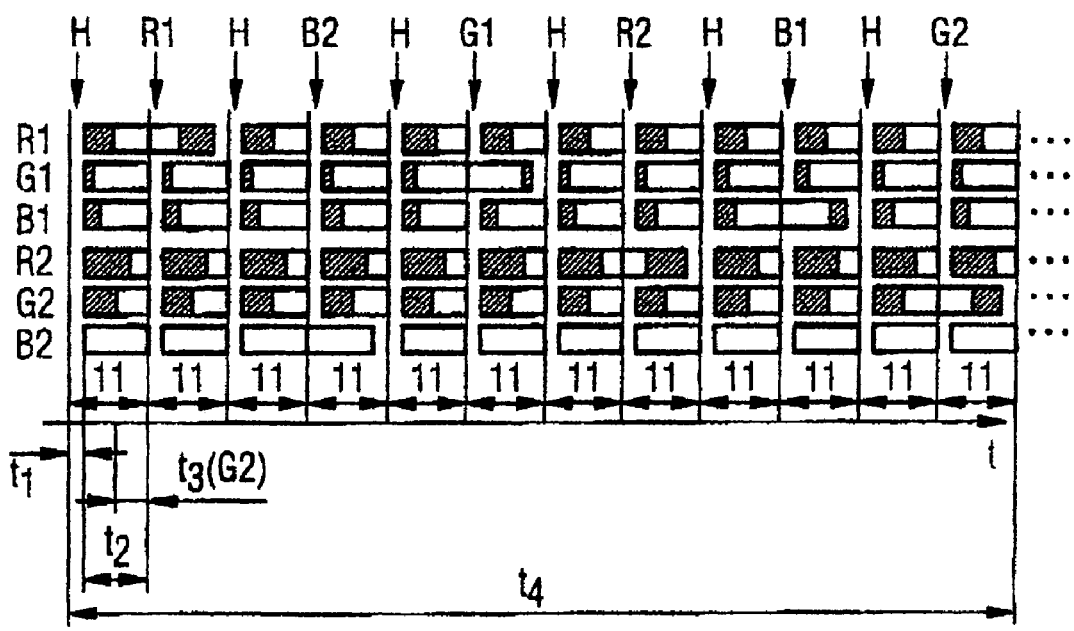

In the case of the exemplary embodiment in accordance with FIG. 4*b*, six modified pulse-width-modulated electrical signals are required for the control of six color channels R1, G1, B1, R2, G2 and B2, which permits the recording of the measured values that are necessary if six color channels R1, R2, G1, G2, B1, B2 are intended to be driven and controlled. As in the case of the exemplary embodiment in accordance with FIG. 3*a*, the basic periods 11 of all the pulse-width-modulated signals are identical in length and not offset temporally. They are again composed of the time intervals $t_1$ and $t_2$. The time interval $t_2$ again specifies the maximum possible duty ratio, and $t_1$ represents the time range in which a measurement of the background brightness or the brightness of a color channel R1, R2, G1, G2, B1, B2 can be carried out. The time interval $t_1$ is situated at the beginning of the basic period 11 and $t_2$ follows it. The black regions within the time interval $t_2$ likewise identify the time range $t_3$ during which the respective color channel R1, R2, G1, G2, B1, B2 is turned on.

For measuring the brightness of a color channel R1, R2, G1, G2, B1, B2, as in the exemplary embodiment in accordance with FIG. 3*a*, the time interval $t_3$ within a basic period 11 is shifted into the range $t_1$. These basic periods 11 alternate with basic periods 11 in which no color channel R1, R2, G1, G2, B1, B2 is turned on within the time interval $t_1$. An overall period 12 containing twelve basic periods 11 is thus produced.

In accordance with the extension of three color channels R, G, B to six color channels R1, R2, G1, G2, B1, B2 as presented above, modified pulse-width-modulated signals can also be assembled for the control of any other desired number of color channels.

Figure 5:
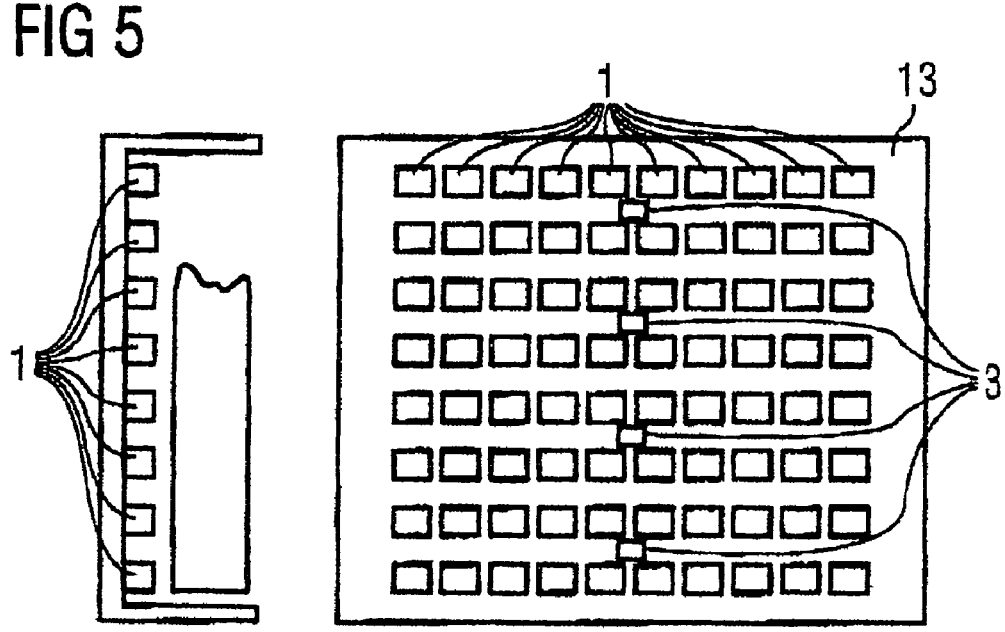
FIG. 5 shows a schematic illustration of a plan view and a section of an illumination device with a plurality of sensor devices arranged in the mixed-color light region of the primary light sources.

For the areal backlighting of a display, it is also possible not only to position the primary light sources 1 laterally with respect to the optical waveguide 2, but to populate the entire area behind the optical waveguide 2 with a plurality of rows of primary light sources 1 (cf. FIG. 5). In this case, the brightness values of the different color channels can also be determined by means of a plurality of sensor devices 3 arranged for example between the rows of the primary radiation sources 1. The control could still be effected by means of a single microcontroller 4 in this case. The synchronized modified pulse-width-modulated control method can thus be extended as desired.

Figure 6:
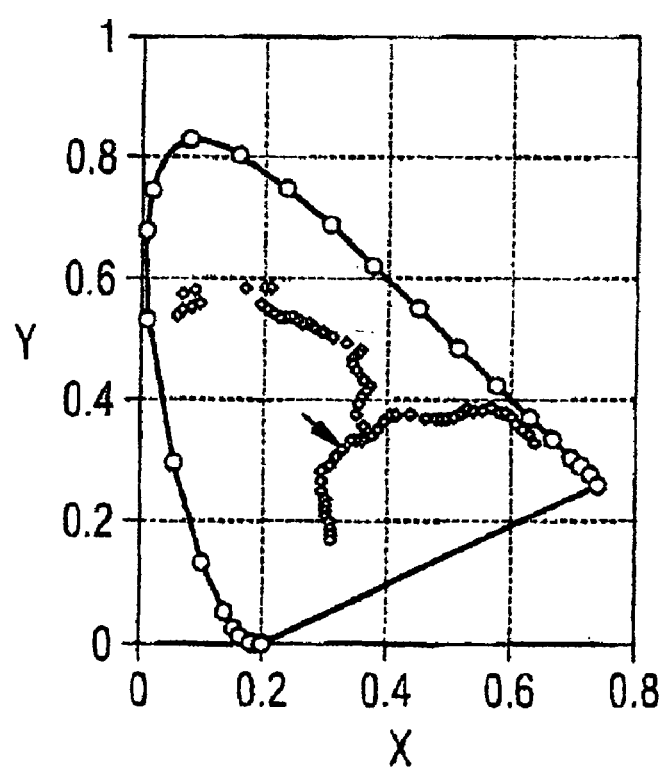
FIG. 6 shows an illustration of the color location of an illumination device on the CIE standard chromaticity diagram as a function of time, the color location being shifted with the aid of the control method in each case preceding from three actual values of the color location in the color region to a desired value of the color location in the white region.

With the aid of the control method it is possible to shift the actual values of the color location from mixed-color light in color regions of the CIE standard chromaticity diagram to a predetermined desired value in the white region of the CIE standard chromaticity diagram within a few seconds (cf. FIG. 6).

Suitable primary light sources 1 include not only RGB LEDs but all color light sources whose brightnesses can be varied with the aid of pulse-width-modulated electrical signals. In particular, it is possible to use, as an alternative to semiconductor LEDs, organic LEDs, electroluminescent films or lasers as primary radiation sources 1.

For the sake of completeness, it should be pointed out that the invention is not, of course, restricted to the exemplary embodiments, rather that all embodiments which are based on the fundamental principle of the invention as explained hereinabove fall within the scope of the invention. The invention is embodied in each novel characteristic and each combination of characteristics, which includes every combination of any features which are stated in the claims, even if this combination of features is not explicitly stated in the claims.

We claim:

1. An illumination device which emits mixed-color light during operation, said light containing light of at least two different color channels (R, R1, G, G1, B, B1), comprising:

at least one first primary light source (1) of a first color, the light of which forms a first color channel (R, R1, G, G1, B, B1);

at least one second primary light source (1) of a second color, the light of which forms a second color channel (R, R1, G, G1, B, B1);

at least one sensor device (3), which is positioned to receive mixed-color light and is suitable for detecting brightness of light of a continuous wavelength range comprising the first and second color channels (R, R1, G, G1, B, B1) and which determines brightness values of the first and second color channels (R, R1, G, G1, B, B1) separately and repeatedly during operation; and an evaluation and control device (4), which, during operation, evaluates the brightness values of the first and second color channels (R, R1, G, G1, B, B1) and determines pulse-width-modulated electrical signals with a basic period (11) modified in such a way for the driving of the first and second color channels (R, R1, G, G1, B, B1) that color location of the mixed-color light lies within a predetermined region of the CIE standard chromaticity diagram.

2. The illumination device as claimed in claim 1, comprising:

at least one first, one second and one third primary light source (1), of which one emits red light, one emits green light and one emits blue light.

3. The illumination device as claimed in claim 1, wherein said predetermined region of the color location of the mixed-color light is in the white region of the CIE standard chromaticity diagram.

4. The illumination device as claimed in claim 1, comprising:

at least six primary light sources (1), the light of which respectively forms two red, two green and two blue color channels (R, R1, G, G1, B, B1), the sensor unit (3) determining the brightness of the individual color channels (R, R1, G, G1, B, B1) separately and repeatedly and the evaluation and control unit (4) in each case determining pulse-width-modulated signals for each color channel (R, R1, G, G1, B, B1) separately.

5. The illumination device as claimed in claim 1, comprising semiconductor light emitting diodes, organic light emitting diodes, lasers or electroluminescent films as primary light sources (1).

6. The illumination device as claimed in claim 1, comprising an evaluation and control device (4) containing a microcontroller.

7. The illumination device as claimed in claim 1, comprising a sensor device (3) containing a photodiode.

8. A device for backlighting a display, comprising an illumination device as claimed in claim 1.

9. A device for backlighting an LCD-display, comprising an illumination device as claimed in claim 1.

10. A method for controlling an illumination device which emits mixed-color light containing light of at least two different color channels (R, R1, G, G1, B, B1), in which each color channel (R, R1, G, G1, B, B1) is driven with a pulse-width-modulated electrical signal with a sequence of basic periods (11), comprising:

modifying the basic periods (11) of a pulse-width-modulated electrical signal such that the basic periods (11) contain a first time interval during which all of the color channels (R, R1, G, G1, B, B1) are turned on simultaneously;

modifying the basic periods (11) of a pulse-width-modulated electrical signal such that they contain at least one second time interval during which only one of the at least two color channels (R, R1, G, G1, B, B1) is turned on and the brightness of the turned-on color channel is in each case determined separately;

repeating the modified basic periods (11) to form an overall period (12); and after the overall period (12) has elapsed, comparing the ratio of the brightnesses of the individual color channels (R, R1, G, G1, B, B1), and setting the duty ratios of the respective modified pulse-width-modulated electrical signals such that the color location of the mixed-color light lies within a predetermined region of the CIE standard chromaticity diagram.

11. The method as claimed in claim 10, wherein the overall period (12) contains at least one basic period (11) modified such that no color channel (R, R1, G, G1, B, B1) is turned on within a time interval of the basic period (11) and the brightness value of the background light is determined within said time interval; and the brightness values of the color channels (R, R1, G, G1, B, B1) are adapted with regard to the brightness value of the background light.

12. The method as claimed in claim 11, wherein a plurality of measured values are recorded and averaged for the purpose of determining the brightness value of the background light.

13. The method as claimed in claim 11, wherein the time interval within the basic period (11) in which the background brightness is determined is equal in magnitude to the time interval in which the brightness of a color channel (R, R1, G, G1, B, B1) is determined.

14. The method as claimed in claim 11, wherein the time interval within the basic period (11) in which the background brightness is determined is less than the time interval within which a color channel (R, R1, G, G1, B, B1) is turned on.

15. The method as claimed in claim 11, in which case, within the overall period (11), a plurality of basic periods (12) within which the brightnesses of the color channels (R, R1, G, G1, B, B1) are determined alternate with those within which the brightness value of the background light is determined.

16. The method as claimed in claim 10, wherein a plurality of measured values are recorded and averaged for the purpose of determining the brightness of a color channel (R, R1, G, G1, B, B1).

17. The method as claimed in claim 10, wherein the time interval within the basic period (11) in which the brightness of a color channel (R, R1, G, G1, B, B1) is determined is less than the time interval in which the respective color channel (R, R1, G, G1, B, B1) is turned on.

18. The method as claimed in claim 10, wherein the duration of an overall period (12) is less than 0.01 second.

\* \* \* \* \*